Feb. 8, 1949.  T. C. JONES  2,461,325
ELECTROLYTIC WATER PURIFIER
Filed March 9, 1944  2 Sheets-Sheet 1
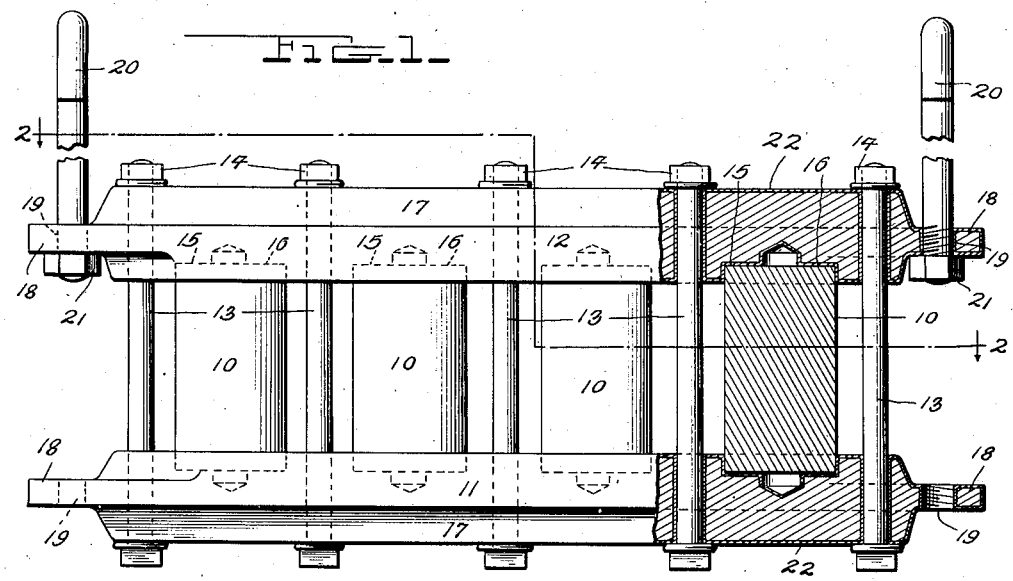
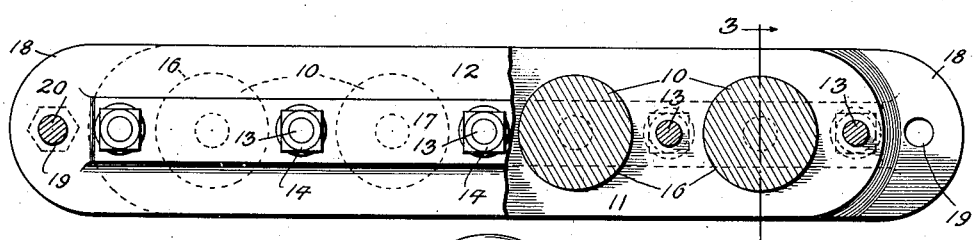
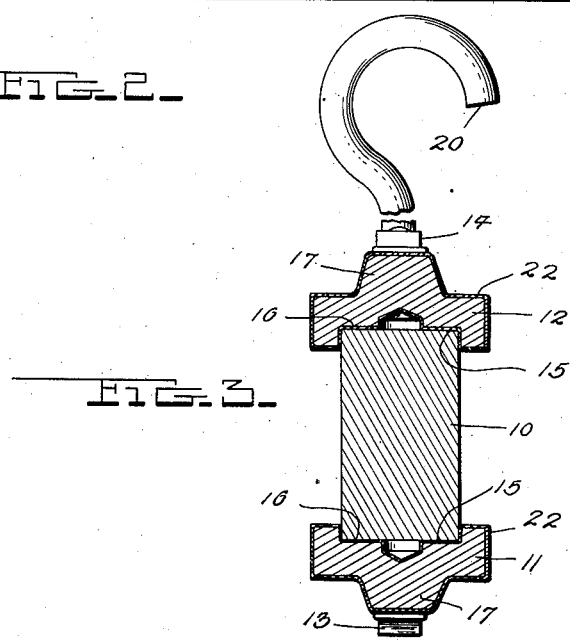
Inventor
T. C. Jones.
By H. B. Willson & Co.
Attorney Feb. 8, 1949. T. C. JONES 2,461,325
ELECTROLYTIC WATER PURIFIER
Filed March 9, 1944 2 Sheets-Sheet 2
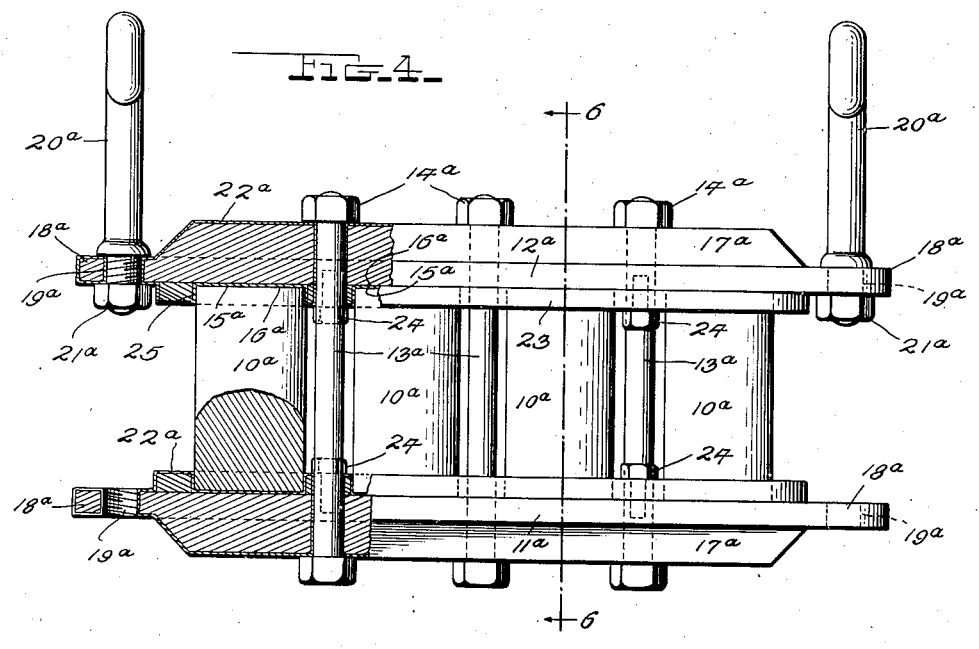
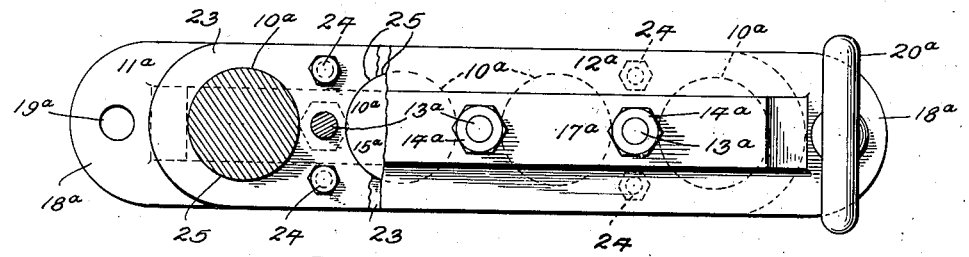
Inventor
T. C. Jones.
By H. B. Willson & Co.
Attorney Patented Feb. 8, 1949

2,461,325

UNITED STATES PATENT OFFICE 2,461,325

ELECTROLYTIC WATER PURIFIER

Theodore C. Jones, Louisville, Ky.

Application March 9, 1944, Serial No. 525,733

1 Claim. (Cl. 204—248)

The invention relates to the art of water purification and more particularly to electrolytic devices used in steam boilers, hot water systems, evaporators, Diesel installations and the like, for precipitating out of solution mineral salts and other scale forming matter in the hot water or liquid and thus increasing steaming efficiency and reducing fuel consumption and for controlling the water as to acidity and alkalinity.

The principal object of the invention is to greatly simplify the construction of galvanic water correction devices, at the same time providing an open-type device which will be kept clean by the natural circulation of boiler water around it and by the flow of feed water, preventing such accumulation of sludge and the like as to be detrimental to life and efficiency of the device.

With the above and other objects in view, the invention resides in the novel features of construction, and the combination and arrangement of parts hereinafter fully described and shown in the accompanying drawing, in which:

Fig. 1 is a side view, partially in section, of an electrolytic water purifying or correcting device showing the preferred form of the invention.

Fig. 2 is a top view with parts broken away and in section substantially on the line 2—2 of Fig. 1.

Fig. 3 is a vertical cross sectional view taken on the line 3—3 of Fig. 2.

Fig. 4 is a side view, partly in section, showing another embodiment of the invention.

Fig. 5 is a top view with parts broken away and in section of the device shown in Fig. 4.

Fig. 6 is a vertical cross sectional view taken on line 6—6 of Fig. 4.

This application is a continuation in part of applicant's copending application Serial No. 493,516, filed July 5, 1943 (now abandoned).

Referring to Figs. 1, 2 and 3 of the drawing, 10 denotes the negative electrodes or inserts which are clamped between a base member 11 and a head member 12 by means of bolts 13 and their nuts 14. These spaced parallel members 11 and 12 constitute the positive electrodes and are in the form of heavy elongated plates or bars much wider than they are thick. The inserts 10 are uniformly spaced apart in a straight row as shown and are preferably of cylindrical rod-like shape having their flat ends 15 positioned and secured within cylindrical sockets or recesses 16 formed in the opposed flat faces of the bars 11 and 12. These bars or members are strengthened by integral, longitudinally extending ribs 17 which project outwardly from the central portions of their outer faces. At the ends of the bars 11, 12 are formed attaching ears or flanges 18 of reduced thickness, as shown, and apertured as at 19 to receive a suspending or clamping means. The apertures 19 may be screw-threaded to receive the threaded ends of suspending hooks 20, clamping nuts 21 being engaged with said threaded ends to securely fasten the hooks to said ears or flanges.

The negative electrodes or inserts 10 are made of a metal or metals capable of causing galvanic action when the device is immersed in the hot water of a boiler or the like. While substantially pure zinc may be used, any suitable zincous alloy may be employed. These rod-like inserts are preferably cut from a bar or rod of metal alloy which has been hot rolled to reduce the size of its crystals and make it relatively non-porous. The inserts have flat ends, the planes of which are truly prependicular to their longitudinal axes. They are all of the same length to the thousandth of an inch and have exactly the same diameter for reasons hereinafter explained.

The bars 11, 12 are preferably made of iron or steel or an alloy of iron and they are completely covered by a metallic coating 22 applied preferably by electro-deposition. While the coating is preferably silver, it may be copper or any of the negative sign electromotive force series of elements having a sufficient electrode potential. These bars 11, 12 are preferably cast but their sockets 16 are formed in the castings prior to electroplating them since the relative diameters of the sockets 16 and the ends of the inserts 10 must be such that these parts when cold may be readily assembled and when heated by the boiler water will produce an effective sealing of the ends of the inserts in the sockets due to the alloy or metal of the inserts having a higher co-efficient of expansion than the metal of the electrode bars. It is not only necessary that the sockets 16 have the same precise diameter and smooth side walls but that the flat bottoms of the sockets in each bar be in the same plane and smooth in order to obtain a good electrical contact and the desired sealing of the ends of the inserts in their sockets when the device is heated by the boiler water and electrolysis takes place. In forming the sockets, tool-guiding holes are drilled in the bar to a depth slightly greater than the depth of the sockets 16 and a special cutter is used to form the sockets. The cutter has at its end a central guide stem to enter the guiding hole and four radiating blades with cutting edges to cut the side wall and bottom of the socket to exact dimensions and positions and with smooth surfaces. These parts of the bars and the inserts 10 are of such relative sizes that the ends of the inserts may be easily inserted in the sockets when the parts are cold but when heated by the boiler water the greater degree of expansion of the alloy or metal of the inserts than the metal of the bars, will cause the end faces of the inserts to be forced with great pressure against the bottoms of the sockets, and side walls of the inserts within the sockets to be forced with great pressure against the side walls of the sockets. There is thus provided not only a good electrical contact but a seal which will exclude water, grease, etc. It has been found in practice that the electrolyte attacks and decomposes the exposed surfaces of the inserts rather than their sealed ends and consequently there is no liability of the partly decomposed inserts falling away from the bars 11, 12 and dropping to the bottom of the boiler or of the entire device collapsing and ceasing to function prior to the time when the inserts are due for replacement in the normal use of the device.

In the device illustrated in Figs. 1, 2 and 3, there are four of the inserts 10 and they are three and a half inches long and one and three-fourths inches in diameter, the top and bottom bars being about fifteen inches long and two and three-fourths inches wide, but it will be understood that the number of inserts may be varied and that the size and proportions of the parts may also vary. The bolts 13 are positioned in a straight row along the longitudinal axis of the bars, one being located midway between each two adjacent inserts and one at each end of the row so that when the nuts 14 are tightened, the several parts will be firmly clamped together. It will be seen that if one or more of the inserts should need replacement before all of the units have been consumed to their limit of usefulness, it is only necessary to remove the nuts 14 and lift the top bar 12 off of the inserts and bolts in order to easily and quickly renew one or more of the inserts.

Figs. 4, 5 and 6 of the drawing shows another way in which a seal may be obtained between the ends of the negative inserts and the positive electrode bars. Those parts in this embodiment which are analogous to like parts in the preferred form bear the same reference number plus the exponent "a" and it is believed unnecessary to repeat the above description of them. In this form of the invention, the positive electrodes 11a, 12a are each formed of a main body portion or bar and a relatively thin plate 23 secured against the inner face of the body portion by bolts or machine screws 24. These plates are of the same material as the body portions of the bars 11a, 12a and of substantially the same width and length. They serve to position the inserts 10a being formed with a row of openings 25 which receive the ends of the inserts as shown in Fig. 4. The sockets 16a are thus formed by these openings and inner opposed faces of the bars 11a, 12a, and in order to effect the above described seal, the opposed inner faces of the body portions of the bars 11a, 12a, and the faces of the plates 23 to be engaged with said inner faces, are both machined so that when the machine screws are tightened, the machined faces of these parts will be held in water-tight contact. The openings 25 are of course accurately bored or machined so that while the parts of the device may be readily assembled when cold, the desired electrical contact and seal will result under the heat of the boiler water due to the proportioning of the parts and the higher co-efficient of expansion of the inserts, as previously explained.

In use, the device is submerged in the hot water of the boiler or other vessel at all times. The hooks 20 or 20a may be employed for suspending the device from the horizontal stay bars, or the water feed trough or the braces in the drum; or the device may be otherwise supported. It may of course rest on boiler tubes in either its upright position shown in the drawing, or on its side, that is with the axes of the inserts extending horizontally. It may also be suitably insulated from the metal of the boiler. The number of the devices used in the boiler will depend upon the number of gallons of water per hour to be corrected and the horsepower load demanded of the boiler. In water tube boilers, the devices should be divided equally between the incoming water drum, the steam drum, and the mud drum.

In the proper functioning of the device, the negative elements or inserts 10 or 10a decompose and waste away, and the electrolytic and chemical action continues until the inserts are almost completely consumed. When this occurs, new inserts should be inserted after the other parts have been cleaned and polished. The inserts waste away from their outer surfaces toward their centers and the provision of the continuous walled sockets 16 or 16a to receive the ends of the inserts together with the water-tight engagement of the inserts with the bottoms and side walls of the sockets 16 or 16a to effectively seal these parts, will prevent the electrolyte from attacking the end portions of the inserts until their intermediate portions have been substantially consumed. That effective seal and the resultant good electrical contact, together with the sturdy construction of all parts of the device gives it a relatively long life and there is no likelihood of the parts being broken or distorted or of the inserts falling out as sometimes happens in devices of this character when the clamped ends of the inserts are not sealed.

Due to the open formation of the device, the boiler water may freely circulate through and around the inserts as well as the top and bottom plates or bars. The circulation is materially facilitated by making the inserts of cylindrical or substantially cylindrical shape. The water as it washes up against the curved surfaces of the inserts does not back off and form an eddy, but flows readily around the insert itself. The decomposed matter or sludge is thus carried away, and sediment and sludge cannot build up on the base bar around the inserts to any material extent. Hence, due to the shape of the parts and their arrangement, the device is self-cleaning and does not have to be periodically removed from the boiler for cleaning in order to keep it functioning properly with the attendant large expense for labor, fuel, etc.

The device above described has proven to be of great advantage in the prevention of scale formation in new installations, and in the removal of scale from old installations.

Excellent results have been obtained from the details disclosed and they are, therefore, preferably followed, but it will be understood that within the scope of the invention as claimed, numerous minor changes may be made.

What is claimed is:

An open-type self-cleaning galvanic boiler water correction device comprising an upper horizontal metallic bar having downwardly open sockets in its lower side and equidistantly spaced apart longitudinally thereof, said downwardly open sockets being of uniform depth and uniform diameter and each having a smooth end surface and a continuous smooth side wall; a lower horizontal metallic bar having upwardly open sockets in its upper side and alined with said downwardly open sockets, said upwardly open sockets having the same depth and diameter as said downwardly open sockets and also having smooth end surfaces and smooth continuous side walls; spaced metallic inserts having their upper ends seated in said downwardly open sockets and their lower ends seated in said upwardly open sockets, said inserts having smooth upper end surfaces water-tightly contacting with said smooth end surfaces of said downwardly open sockets and having smooth lower end surfaces water-tightly contacting with said smooth end surfaces of said upwardly open sockets, said inserts having smooth peripheral surfaces within said sockets and so related with said smooth side walls thereof as to water-tightly contact with said side walls during use, the coefficient of expansion of said inserts being greater than that of said bars to insure the last mentioned water-tight contact; and tie bolts spaced apart along said bars and rigidly holding said bars and elements in assembled relation; said bars being galvanically cooperative with said inserts to cause erosive decomposition of the latter in use; the aforesaid water-tight contact between the aforesaid smooth peripheral and end surfaces of said inserts and the smooth socket side walls and end surfaces serving to prevent the electrolytic boiler water from erosively decomposing the socket-contained ends of said inserts, whereby said inserts cannot become erosively freed from said sockets during the life of the device.

THEODORE C. JONES.

REFERENCES CITED

The following references are of record in the file of this patent:

UNITED STATES PATENTS

| Number | Name | Date |
| --- | --- | --- |
| 435,518 | Pollock | Sept. 2, 1890 |
| 629,092 | Ross | July 18, 1899 |
| 685,176 | Ross | Oct. 22, 1901 |
| 779,326 | Stewart | Jan. 3, 1905 |
| 999,108 | Hickey | July 25, 1911 |
| 1,646,736 | Mills | Oct. 25, 1927 |
| 1,705,197 | Mills | Mar. 12, 1929 |
| 2,058,370 | Thompson | Oct. 20, 1936 |
| 2,193,667 | Bary | Mar. 12, 1940 |
| 2,204,823 | Rhodes | June 18, 1940 |
| 2,321,796 | Butler | June 15, 1943 |
| 2,337,151 | Butler | Dec. 21, 1943 |
| 2,348,882 | Butler | May 16, 1944 |

FOREIGN PATENTS

| Number | Country | Date |
| --- | --- | --- |
| 2,662 | Great Britain | 1885 |

OTHER REFERENCES

"Transactions of The Electrochemical Society," vol. 76, (1939), pages 247 through 255.

"Electrochemistry," by Creighton, fourth edition (1943), pages 36, 37, 194, 195.